United States Patent
Davis et al.

(10) Patent No.: US 6,427,091 B1
(45) Date of Patent: Jul. 30, 2002

(54) SYSTEM AND METHOD FOR ASSOCIATING A CERTIFICATE OF AUTHENTICITY WITH A SPECIFIC COMPUTER

(75) Inventors: Tracy Lee Davis, Georgetown; Timothy James McNulty, Cedar Park, both of TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/489,727

(22) Filed: Jan. 24, 2000

(51) Int. Cl.[7] .......................... G06F 19/00; G06F 7/00; H04L 9/32
(52) U.S. Cl. .................. 700/115; 700/95; 700/215; 700/227; 713/200
(58) Field of Search .................. 700/95, 115, 116, 700/215, 216, 221–227; 713/200

(56) References Cited

U.S. PATENT DOCUMENTS

| | | | | |
|---|---|---|---|---|
| 5,469,363 A | * | 11/1995 | Saliga | 235/380 |
| 5,560,718 A | * | 10/1996 | Furuya | 358/1.17 |
| 5,896,293 A | * | 4/1999 | Teramoto et al. | 242/532.4 |
| 6,236,901 B1 | * | 5/2001 | Goss | 361/692 |
| 6,240,334 B1 | * | 5/2001 | Duke et al. | 270/1.02 |
| 6,243,468 B1 | * | 6/2001 | Pearce et al. | 380/255 |
| 6,246,778 B1 | * | 6/2001 | Moore | 340/5.1 |
| 6,314,337 B1 | * | 11/2001 | Marcum | 198/358 |

* cited by examiner

Primary Examiner—Leo Picard
Assistant Examiner—Elliott Frank
(74) Attorney, Agent, or Firm—Haynes and Boone, LLP

(57) ABSTRACT

A method and system for managing unique COA labels in a build-to-order computer manufacturing environment. In one embodiment, a bar code located on OS back-up media identifies unique COA information for the media. At an early stage of the manufacturing process, a line operator takes a traveler and scans in the order information. At the same time, the operator obtains the OS back-up media for the traveler and scans in the bar code. Once scanned, a COA label having imprinted thereon the COA information is printed and provided to the operator along with a service tag having imprinted thereon the track code for the computer. The service tag and COA label are then affixed to the computer chassis. The manufacturing control system matches the track code with the COA label information that is later downloaded to the hard drive at extended test ("ET") of the computer. Alternatively, the COA label information may be downloaded to the hard drive of the computer prior to installation of the had drive into the computer. In an alternative embodiment, the preprinted COA labels are retrieved from a secure location, such as a security cabinet, and the information thereon scanned into the system to be associated with the track code.

25 Claims, 2 Drawing Sheets

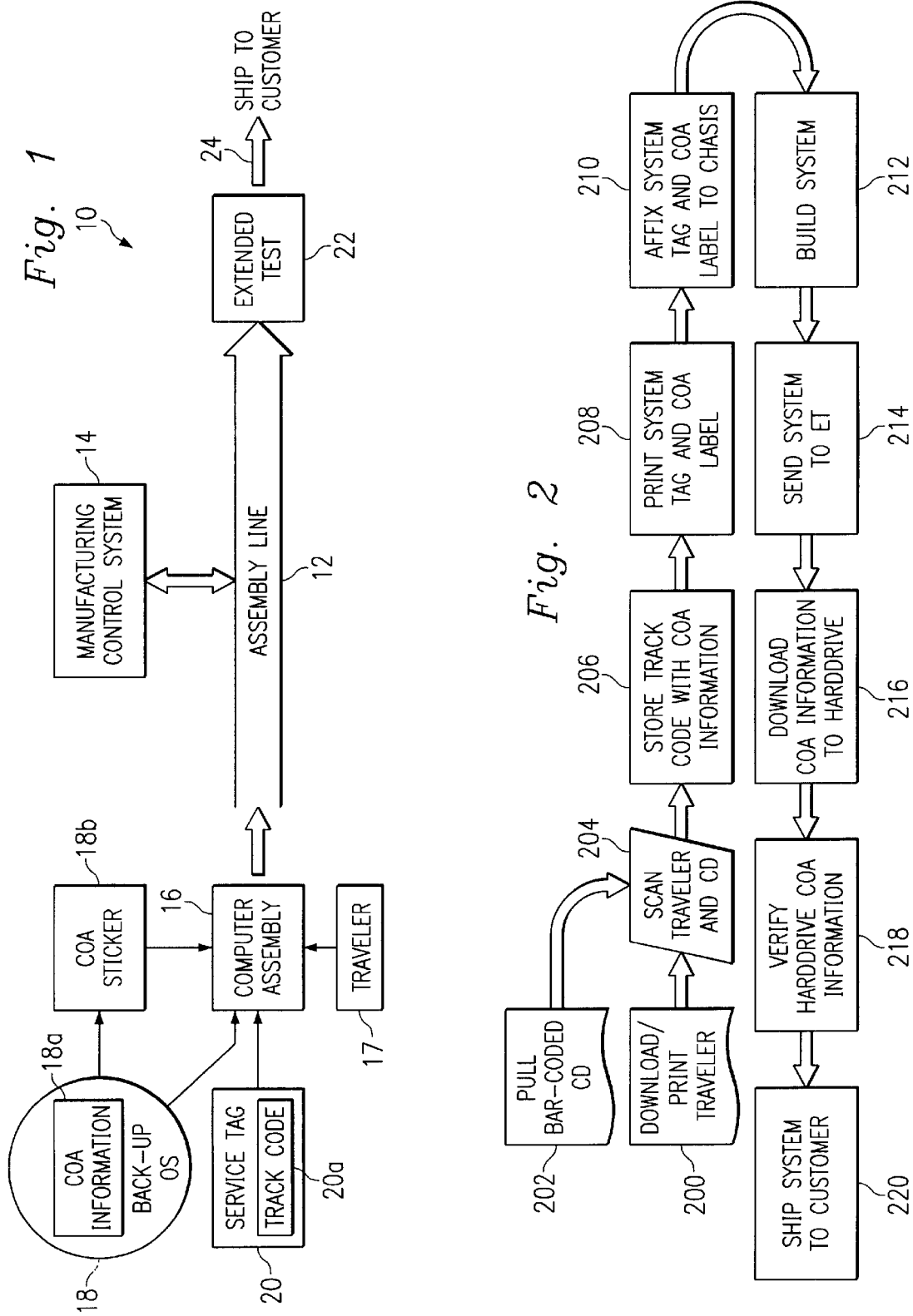

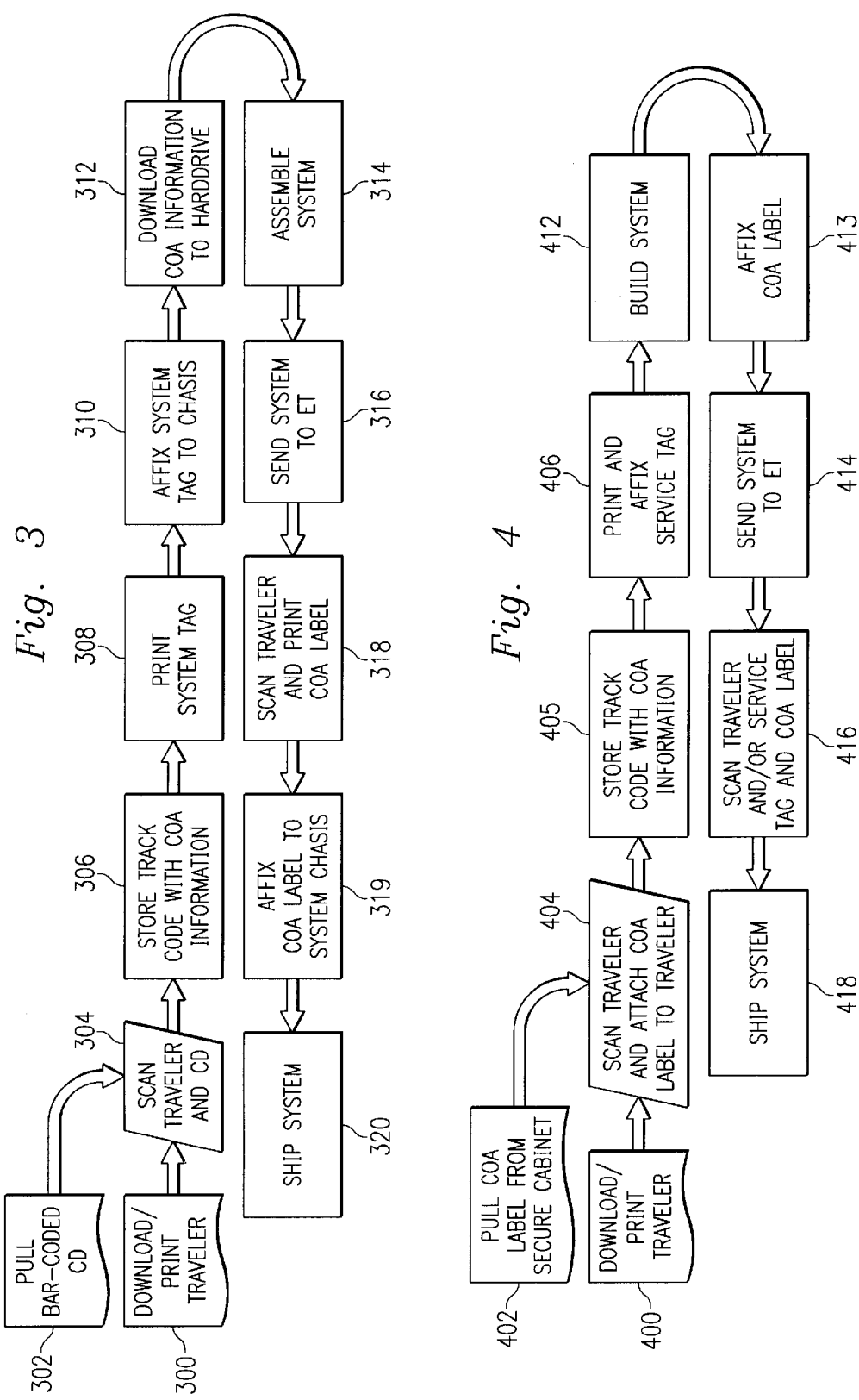

SYSTEM AND METHOD FOR ASSOCIATING A CERTIFICATE OF AUTHENTICITY WITH A SPECIFIC COMPUTER

BACKGROUND

The disclosures herein relate generally to build-to-order computer systems and, more particularly, to a technique for managing Certificate of Authenticity ("COA") labels to be attached to the chassis of such computer systems.

This application related to co-pending U.S. patent application Ser. No. 09/053,524, filed on Mar. 31, 1998, entitled MANUFACTURING SYSTEM AND METHOD FOR ASSEMBLY OF COMPUTER SYSTEMS IN A BUILD-TO-ORDER ENVIRONMENT, naming Lois Goss as inventor, and U.S. patent application Ser. No. 09/141,241, filed on Aug. 27, 1998, entitled AUTOMATED CONSOLIDATION STATION, naming Lorne Marcum as inventor. The co-pending applications are incorporated herein by reference in their entirety, and are assigned to the assignee of this invention.

One of the issues with which computer software developers must deal on a daily basis is the issue of software piracy. In an effort to combat this problem, developers have been attempting to track where the pirated copies originate and have found that a significant portion originate via computer manufacturers, or OEMs. One manner in which this is thought to occur is illustrated in the following example. An OEM ships 1000 computers to a large corporate customer. Accompanying these 1000 computers are 1000 copies of back-up media associated with the computers. Typically, the back-up media copies do not accompany the respective computers to an end user and wind up in some central storage location. It has been suggested that these copies somehow find their way into the pirated marketplace, either through resale or distribution with a computer other than that originally intended.

As a result of this problem, at least one major software developer has proposed guidelines to be followed by its OEMs that would link each back-up media copy to a specific computer. In particular, currently an OEM includes with each computer it ships a shrink-wrapped "Associated Product Material," or "APM," kit which includes a CD-ROM having stored thereon the operating system ("OS") for the computer and back-up documentation, including a Certificate of Authenticity ("COA"). Typically, copies of these APM kits are obtained from the computer software developer, or an authorized replicator thereof and are stocked by the OEM at its various manufacturing locations and on the manufacturing line.

In one implementation of a build-to-order computer manufacturing environment, when a computer is ordered, a traveler is developed for the computer that indicates what parts are to be included therein. At various points in the assembly line, the traveler is scanned into the manufacturing control system and a line operator is instructed as to which parts need to be included with the computer at that point. One such "part" is an APM kit, which the line operator simply picks out of the indicated bin and includes in the box in which the computer is ultimately shipped to the customer. This method causes no additional problems for a build-to-order OEM because each APM kit is not associated with one and only one computer and the COA is included with the APM kit and therefore also not associated with any one particular computer.

In a further effort to combat piracy, at least one software developer has implemented guidelines requiring OEMs to attach to the chassis of each computer on which its software is installed a non-removable COA label having imprinted thereon a unique product key for use in the event the customer needs to reinstall the OS. The idea here is to minimize product support issues encountered due to lost product keys by providing quick and easy verification that a computer has a base license even if the associated media and documentation are lost. Clearly, this development raises some concerns with respect to the otherwise streamlined manufacturing flow of a build-to-order computer manufacturer. Specifically, the question has arisen as to how to tie a specific COA label to a specific, build-to-order computer.

Therefore, what is needed is a method of managing COA labels in a build-to-order computer manufacturing environment when each COA label must be associated with a particular computer.

SUMMARY

One embodiment, accordingly, provides a method and system for preparing and managing COA labels in a manufacturing environment. To this end, a method is described for associating a unique certificate of authenticity (COA) number with a particular computer which is identified by a unique track code. The method includes associating the COA number with the unique track code, storing the associated COA number on a hard drive of the computer, and affixing a label including the COA number to the computer.

A technical advantage achieved is that the COA and associated OS back-up media can be associated with a single, build-to-order computer.

BRIEF DESCRIPTION OF THE DRAWING FIGURES

FIG. 1 is a flow diagram illustrating a build-to-order computer manufacturing environment in accordance with one embodiment.

FIG. 2 is a flow diagram of a method of COA label management for use in the manufacturing environment of FIG. 1 in accordance with one embodiment.

FIG. 3 is a flow diagram of a method of COA label management for use in the manufacturing environment of FIG. 1 in accordance with an alternative embodiment.

FIG. 4 is a flow diagram of a method of COA label management for use in the manufacturing environment of FIG. 1 in accordance with another alternative embodiment.

DETAILED DESCRIPTION

FIG. 1 is a flow diagram illustrating a build-to-order computer manufacturing environment 10 according to one embodiment. As shown in FIG. 1, the manufacturing environment 10 includes an assembly line 12 certain functions of which are controlled by a manufacturing control system 14. Although not shown in FIG. 1, it will be recognized that the manufacturing control system includes various control units and databases for controlling the operation of certain components of the assembly line 12, for providing instructions to line operators on the assembly line 12, and for generating data to and receiving data from the assembly line 12.

Each computer to be assembled in the manufacturing environment 10, represented in FIG. 1 by a computer 16, has associated therewith a traveler 17 which indicates what parts (both hardware and software) are to be included in the computer 16. As will be described in greater detail in connection with FIGS. 2 and 3, the computer 16 also has associated therewith OS back-up media 18, which in one embodiment includes a CD-ROM having bar-coded COA information 18a included thereon for use in generating a COA label 18b, and a service tag 20 including a track code 20a, which serves as an identification number for the computer 16. The computer 16 proceeds down the assembly line 12 until completely assembled, at which point it undergoes an extended test ("ET") 22. If the ET is successfully completed, the computer 16 is shipped to a customer at a point 24.

FIG. 2 is a flow diagram illustrating a method of COA label management in accordance with one embodiment. As illustrated in FIGS. 1 and 2, the traveler 17 for the computer 16 is downloaded and/or printed (step 200) and the OS back-up media 18 containing the bar-coded COA information 18a is pulled (step 202) from an appropriate bin. In step 204, the traveler 17 and COA information 18a are scanned into the manufacturing control system 14. In step 206, the track code 20a for the computer 16 and the COA information 18a are stored in an appropriate database of the manufacturing control system 14 to be downloaded during ET of the computer (step 216). In step 208, the service tag 20 and COA label 18b for the computer 16 are printed and then affixed to the computer chassis in step 210. In step 212, the computer 16 continues down the assembly line 12 until completely assembled, at which point, in step 214, the computer is sent to ET 24. In step 216, during ET, the COA information 18a is downloaded to the hard drive of the computer 16. In step 218, the traveler 17 and/or COA label 18b is again scanned to verify that the COA information downloaded to the hard drive matches the COA information originally assigned to the computer 16. In step 220, the computer 16 is shipped to the customer.

FIG. 3 is a flow diagram illustrating a method of COA label management in accordance with an alternative embodiment. As shown in FIGS. 1 and 3, the traveler 17 for the computer 16 is downloaded and/or printed (step 300) and the OS back-up media 18 containing the bar-coded COA information 18a is pulled (step 302) from the appropriate bin. In step 304, the traveler 17 and COA information 18a are scanned into the manufacturing control system 14. In step 306, the track code 20a for the computer 16 and the COA information 18a are stored in an appropriate database of the manufacturing control system 14 for use in off-line hard drive download (step 312). In particular, in this alternative embodiment, the COA information 18a is downloaded to the hard drive to be installed in the computer offline prior to assembly of the computer. In this manner, a fairly significant time savings can be realized by not having to download this information during ET. The COA information stored on the hard drive is subsequently verified when the COA label 18b is printed (step 318). In step 308, the service tag 20 for the computer 16 is printed and then affixed to the computer chassis in step 310. In step 312, at some point prior to assembly of the computer 16 (step 314) the COA information 18a is downloaded offline to the hard drive of the computer 16. In step 314, the computer 16 continues down the assembly line 12 until completely assembled, at which point, in step 316, the computer is sent to ET 24. In step 318, the traveler 17 is again scanned to verify that the COA information downloaded to the hard drive matches the COA information originally assigned to the computer 16 and the COA label 18b is printed. In step 319, the COA label 18b is affixed to the chassis of the computer 16. In step 320, the computer 16 is shipped to the customer.

Although for many reasons it would be preferable for the manufacturer to be able to print the COA label 18b to be attached to the computer 16, in some cases, this will not be possible and the COA labels will be supplied to the manufacturer through an authorized distributor. In this case, a modified COA label management method, such as that shown in FIG. 4 below, may be necessary.

In particular, FIG. 4 is a flow diagram illustrating a method of COA label management in accordance with yet another alternative embodiment. As illustrated in FIGS. 1 and 4, the traveler 17 for the computer 16 is downloaded and/or printed (step 400) and the COA label 18b is pulled from a secure location(step 402). In step 404, the traveler 17 is scanned into the manufacturing control system 14 and the COA label 18b is associated with the computer 16, e.g., via a sleeve in which the traveler and OS back-up media 18 are contained. In step 405, the track code 20a for the computer 16 and the COA information 18a are stored in an appropriate database of the manufacturing control system 14 for use in ET hard drive download (step 414). In step 406, the service tag 20 is printed and affixed to the computer. In step 412, the computer 16 continues down the assembly line 12 until completely assembled, at which point, in step 413, the COA label 18b is detached from the traveler 17 and affixed to the chassis of the computer 16. In step 414, the computer 16 is sent to ET 24. In step 416, the COA label 18b and traveler 17 and/or service tag 20 are again scanned to verify that the COA information downloaded to the hard drive matches the COA information originally assigned to the computer 16. In step 420, the computer 16 is shipped to the customer.

In operation, at an early stage of the manufacturing process, a line operator takes a traveler and scans in the order information. At the same time, the operator obtains the OS back-up media for the traveler and scans in the encrypted bar code, identifying the COA information for the media. Once scanned, a COA label having imprinted thereon the product key for the computer is printed and provided to the operator at the same time a service tag having imprinted thereon the track code for the computer is generated. The service tag and COA label are then affixed to the appropriate computer chassis. At this time, the manufacturing control system matches the track code with the COA label information that is later downloaded to the hard drive during an Extended Test ("ET") of the computer. In addition, the OS back-up media can be attached to the traveler for the computer via a sleeve to be added to the computer package.

In an alternative embodiment, the COA information is pre-installed on a hard drive, in which case the COA label is later printed and affixed to the computer in which the hard drive is installed and the COA information subsequently verified.

In yet another alternative embodiment, the COA sticker is not printed in the manufacturing environment; rather, it is obtained from a secure location and forwarded with the computer system down the assembly line.

Although illustrative embodiments have been shown and described, a wide range of modification, change, and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method of associating a unique certificate of authenticity ("COA") number with a particular computer in a build-to-order computer manufacturing environment in which said computer is identified by a unique track code, the method comprising the step of:

associating a COA number with said unique track code;

storing said associated COA number on a hard drive of said computer; and affixing a label including said COA number to said computer.

2. The method of claim 1 wherein said associating comprises storing said track code with said COA number in a database of a manufacturing control system.

3. The method of claim 2 further comprising the step of:

a prior to said storing said track code with said COA number, scanning said track code and said COA number into said manufacturing control system.

4. The method of claim 2 wherein said storing comprises downloading said COA number from said manufacturing control system to said hard drive.

5. The method of claim 4 wherein said downloading occurs prior to installation of said hard drive in said computer.

6. The method of claim 4 wherein said downloading occurs during an extended test ("ET") of said computer.

7. The method of claim 1 further comprising the step of:

comparing said COA number stored on said hard drive with said COA number included on said label to confirm a match therebetween.

8. The method of claim 1 further comprising the step of:

prior to said affixing, printing said COA label.

9. The method of claim 1 further comprising the step of:

prior to said associating, obtaining said COA label from a secure location.

10. A system for associating a unique certificate of authenticity ("COA") number with a particular computer in a build-to-order computer manufacturing environment in which said computer is identified by a unique track code, the system comprising:

means for associating a COA number with said unique track code;

means for storing said associated COA number on a hard drive of said computer; and means for affixing a label including said COA number to said computer.

11. The system of claim 10 wherein said means for associating comprises means for storing said track code with said COA number in a database of a manufacturing control system.

12. The system of claim 11 further comprising:

prior to said storing said track code with said COA number, scanning said track code and said COA number into said manufacturing control system.

13. The system of claim 11 wherein said means for storing comprises means for downloading said COA number from said manufacturing control system to said hard drive.

14. The system of claim 13 wherein said downloading occurs prior to installation of said hard drive in said computer.

15. The system of claim 13 wherein said downloading occurs during an extended test ("ET") of said computer.

16. The system of claim 10 further comprising:

means for comparing said COA number stored on said hard drive with said COA number included on said label to confirm a match therebetween.

17. The system of claim 10 further comprising:

means for printing said COA label prior to said affixing.

18. The system of claim 10 further comprising:

means for obtaining said COA label from a secure location prior to said associating.

19. A method of associating a unique certificate of authenticity ("COA") number with a particular computer in a build-to-order computer manufacturing environment in which said computer is identified by a unique track code, the method comprising the steps of:

scanning said track code and said COA number into said manufacturing control system;

associating said track code with said COA number in a database of a manufacturing control system;

associating a COA number with said unique track code;

storing said associated COA number on a hard drive of said computer;

affixing a label including said COA number to said computer; and comparing said COA number stored on said hard drive with said COA number included on said label to confirm a match therebetween.

20. The method of claim 19 wherein said storing comprises downloading said COA number from said manufacturing control system to said hard drive.

21. The method of claim 20 wherein said downloading occurs prior to installation of said hard drive in said computer.

22. The method of claim 20 wherein said downloading occurs during an extended test ("ET") of said computer.

23. The method of claim 19 further comprising the step of:

prior to said affixing, printing said COA label.

24. The method of claim 19 further comprising the step of:

prior to said associating, obtaining said COA label from a secure location.

25. The method of claim 19 wherein said COA number is associated with a unique copy of operating system back-up media.

* * * * *